United States Patent [19]
Konagaya et al.

[11] Patent Number: 5,625,524
[45] Date of Patent: Apr. 29, 1997

[54] REVERSIBLE THERMOSENSITIVE RECORDING MEDIUM AND METHOD OF PRODUCING THE SAME

[75] Inventors: Yukio Konagaya, Shimizumachi; Takao Igawa, Numazu; Fumihito Masubuchi; Akihide Itoh, both of Mishima; Tohru Nogiwa, Numazu, all of Japan

[73] Assignee: Ricoh Company, Ltd., Tokyo, Japan

[21] Appl. No.: 508,204

[22] Filed: Jul. 27, 1995

[30] Foreign Application Priority Data

Jul. 28, 1994 [JP] Japan .................. 6-195909

[51] Int. Cl.⁶ .................. G11C 11/46
[52] U.S. Cl. .................. 365/127; 365/120
[58] Field of Search .................. 365/127, 120, 365/106, 118, 119, 126

[56] References Cited

U.S. PATENT DOCUMENTS

| | | |
|---|---|---|
| 4,425,161 | 1/1984 | Shimbahashi et al. .................. 365/127 |
| 5,158,924 | 10/1992 | Konagaya et al. . |
| 5,158,926 | 10/1992 | Hotta et al. . |
| 5,219,820 | 6/1993 | Morohoshi et al. . |
| 5,283,220 | 2/1994 | Kawaguchi et al. . |

*Primary Examiner*—Terrell W. Fears
*Attorney, Agent, or Firm*—Oblon, Spivak, McClelland, Maier & Neustadt, P.C.

[57] ABSTRACT

A reversible thermosensitive recording medium having a support, a reversible thermosensitive recording layer formed thereon which contains a matrix resin and an organic low-molecular-weight material dispersed in the matrix resin, capable of reversibly assuming a transparent state and a white opaque state depending on the temperature thereof, and a magnetic recording layer formed on the reversible thermosensitive recording layer, and optionally, an anchor layer, which is provided on the reversible thermosensitive recording layer. The magnetic recording layer is integrally provided in a part of the reversible thermosensitive recording layer or the anchor layer by a step of fusion-bonding, applying, or transferring.

21 Claims, 8 Drawing Sheets

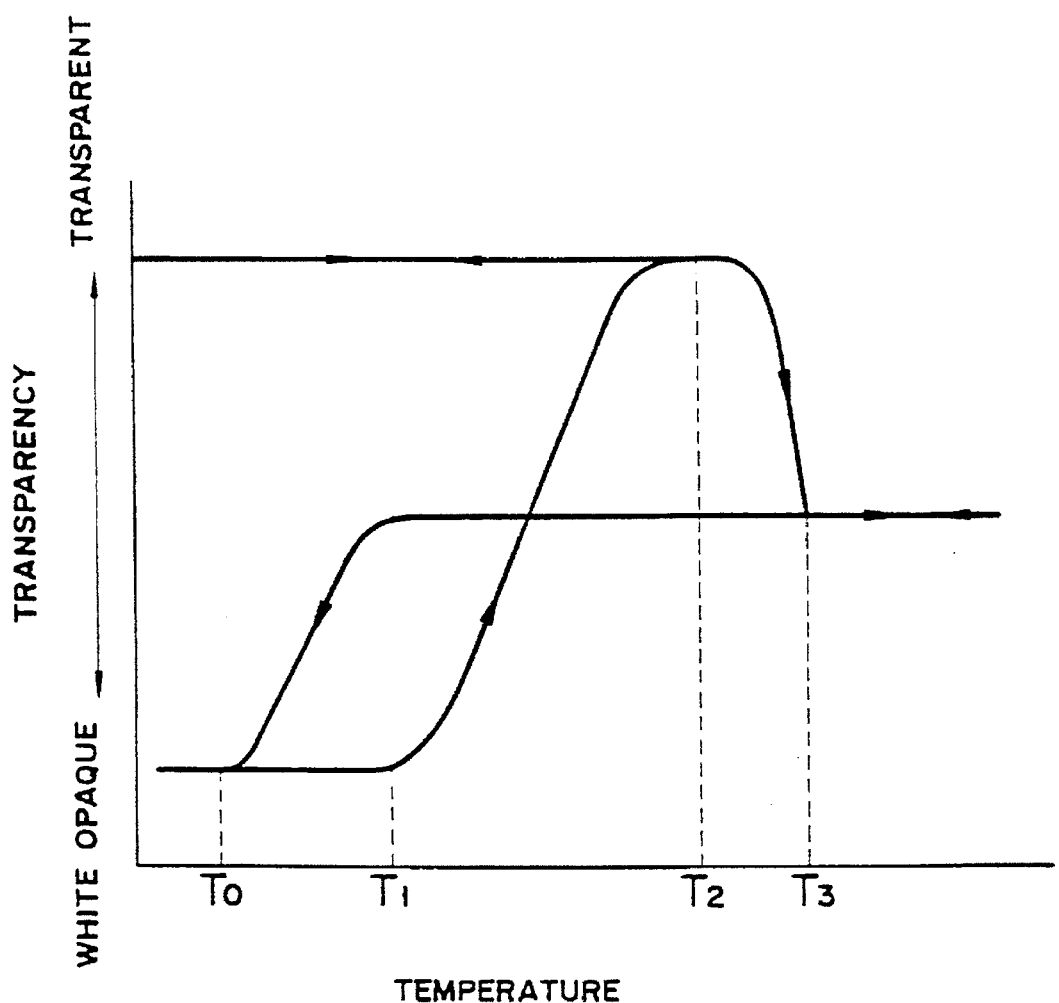

REVERSIBLE THERMOSENSITIVE RECORDING MEDIUM AND METHOD OF PRODUCING THE SAME

BACKGROUND OF THE INVENTION

1. Field of the Invention

The present invention relates to a reversible thermosensitive recording medium and, more particularly, to a reversible thermosensitive recording medium comprising a support, a reversible thermosensitive recording layer formed thereon capable of reversibly changing its transparency from a transparent state to a white opaque state, and vice versa, depending upon the temperature thereof, and a magnetic recording layer which is integrally formed in a part of the reversible thermosensitive recording layer. In addition, the present invention relates to a method of producing the above-mentioned reversible thermosensitive recording medium.

2. Discussion of Background

Recently attention has been paid to a reversible thermosensitive recording medium capable of temporarily recording images thereon and erasing the same therefrom when such images become unnecessary. For example, there is conventionally known a reversible thermosensitive recording medium comprising a reversible thermosensitive recording layer in which an organic low-molecular-weight material such as a higher fatty acid is dispersed in a matrix resin with a low glass transition temperature, such as a vinyl chloride-vinyl acetate copolymer, as disclosed in Japanese Laid-Open Patent Applications 54-119377 and 55-154198.

Furthermore, between a support and a reversible thermosensitive recording layer of the above-mentioned reversible thermosensitive recording medium, the provision of a colored layer is proposed as disclosed in Japanese Laid-Open Utility Model Application 2-3876; the provision of a light reflection layer, in Japanese Laid-Open Patent Application 64-14079; and the provision of a thin layer with a refractive index different from that of the reversible thermosensitive recording layer in a transparent state, in Japanese Laid-Open Patent Application 2-175280. In addition, a variety of protective layers are proposed for this kind of reversible thermosensitive recording medium. For example, there are proposed a protective layer comprising a silicone rubber or a silicone resin as disclosed in Japanese Laid-Open Patent Application 63-221087; a protective layer comprising a polysiloxane graft polymer as disclosed in Japanese Laid-Open Patent Application 63-317385; and a protective layer comprising an ultraviolet-curing resin or electron radiation curing resin an disclosed in Japanese Laid-Open Patent Application 2-566.

A recording medium comprising a magnetic recording layer and a thermosensitive recording layer is actively developed, and this kind of recording medium has been put to practical use as a passenger ticket and a commutation ticket. In addition, a magnetic recording card provided with a thermosensitive recording layer capable of indicating the used condition of the card is disclosed in Japanese Laid-Open Patent Applications 59-199284 and 60-18388, and such a recording card has also been put to practical use as a prepaid card for paying the charge for the public telephone and the fare for the railway. Further, the holders of the prepaid card or cash card wants to know the balance each time the prepaid card or cash card is used. In compliance with such a request, there is proposed a magnetic recording card with a reversible thermosensitive recording layer capable of indicating the information such as a balance of the card, and rewriting the information, as disclosed in Japanese Laid-Open Patent Application 1-181766.

As previously mentioned, a recording medium capable of carrying out both magnetic recording and thermal recording has achieved a rapid development. In the development of this kind of recording medium, a magnetic recording layer and a thermosensitive recording layer are generally provided on the opposite sides of a support of the recording medium. When the magnetic recording layer and the thermosensitive recording layer are provided on the same side of the support, the thermosensitive recording layer is commonly overlaid on the magnetic recording layer in order to facilitate the recognition of information displayed on the thermosensitive recording layer. In this case, however, the output from the magnetic recording layer is weakened and reading errors frequently occur when the thermosensitive recording layer is thick. On the contrary, when the thickness of the thermosensitive recording layer is decreased, the image density of images formed on the thermosensitive recording layer is decreased, so that it is difficult to recognize the images.

When the reversible thermosensitive recording layer and the magnetic recording layer are provided on the same side of the support of a recording medium, the following advantages can be obtained:

(1) An apparatus for recording and reading information can be disposed on one side of the recording medium.

(2) Another magnetic recording layer can be provided on the other side, so that the magnetic recording capacity can be increased.

(3) The side of the recording medium on which no recording layer is provided can be freely designed.

In light of the above-mentioned advantages, various improvements have been introduced in such a recording medium comprising a magnetic recording layer and a reversible thermosensitive recording layer which are provided on the same side of the support. For instance, there is proposed an information recording and display medium which comprises a support, and a magnetic recording layer, a light reflection layer with a thickness of 0.02 to 0.1 μm and a reversible thermosensitive recording layer with a thickness of 2 to 8 μm which are successively overlaid on the support in this order, as disclosed in Japanese Laid-Open Patent Application 3-130188. According to this application, the image formed on the reversible thermosensitive recording layer can be easily recognized owing to the light reflection layer formed thereunder, and at the same time, the decrease of output from the magnetic recording layer can be prevented by limiting the total thickness of the layers provided over the magnetic recording layer to 10 μm or less.

Further, a magnetic recording medium with a thermosensitive display portion is proposed as disclosed in Japanese Laid-Open Patent Application 5-177975, which comprises a support, a deposited magnetic recording layer with a thickness of 2 to 10 μm provided on the support, and a reversible thermosensitive recording layer with a thickness of about 7 μm directly provided on the magnetic recording layer. The layer structure of this magnetic recording medium is simplified to decrease the thickness of the layers provided over the magnetic recording layer to 10 μm or less. Thus, the magnetic recording performance can be improved without impairing the thermal recording performance.

In any of the above-mentioned recording media, the reversible thermosensitive recording layer is provided on the magnetic recording layer, and the total thickness of the layers provided over the magnetic recording layer is decreased to improve the magnetic recording performance.

However, these recording media have the shortcomings that the image forming performance of the reversible thermosensitive recording layer cannot be enhanced, and the recording output performance from the magnetic recording layer cannot be improved.

To eliminate the above-mentioned shortcomings, there is a demand for a recording medium in which no layer is provided on the recording layers except a thin-layered protective layer. As disclosed in Japanese Laid-Open Patent Application 4-220400, it is proposed to provide a magnetic recording layer in a part of a reversible thermosensitive recording layer. However, the structure of the layers and the method of producing such a recording medium are not specifically described in the application, and the durability of the obtained magnetic recording layer is not clarified.

The recording medium comprising the magnetic recording layer and the reversible thermosensitive recording layer is regarded as useful when applied to the cash card or the like. It is therefore supposed that this kind of recording medium be often allowed to manually pass through a magnetic reader while in use. In light of the usage of this kind of recording medium, the durability of the magnetic recording layer becomes one of the most important factors in the recording medium in which the magnetic recording layer is provided in a part of the reversible thermosensitive recording layer.

Representative examples of the conventional recording medium which comprises a magnetic recording layer and a reversible thermosensitive recording layer which are provided on the same side of a support will now be explained by referring to FIG. 9.

A recording medium Q as shown in FIG. 9, which is disclosed in the previously mentioned Japanese Laid-Open Patent Application 4-220400, comprises a support 1, and a light reflection layer 2, a reversible thermosensitive recording layer 3 and a protective layer 4 which are successively provided on the front side of the support 1, and in addition, a magnetic recording layer 5 is partially provided on the protective layer 4.

The structure of layers provided on the front side of a support 1 in a recording medium S of FIG. 9 is the same as that of the recording medium Q. In the recording medium S, there are provided another magnetic recording layer 9 and another protective layer 10 on the back side of the support 1, opposite to the light reflection layer 2 with respect to the support 1. The recording medium S is a typical example which comprises a thermosensitive recording layer 3 and a magnetic recording layer 9 provided on the opposite sides of the support.

The recording media Q and S as shown in FIG. 9 have the shortcoming that the adhesion between the protective layer 4 and the magnetic recording layer 5 is so weak that the durability of the magnetic recording layer 5 is low.

Further, when the magnetic recording layer is provided on the reversible thermosensitive recording layer, improvements of an adhesive for use in the magnetic recording layer are proposed. However, improvements of the adhesive are limited because the adhesive may seriously affect the reversible thermosensitive recording layer. In addition, there is proposed the improvement of the protective layer 4 in order to increase the adhesion between the magnetic recording layer 5 and the protective layer 4 in the recording medium Q or S as shown in FIG. 9. In this case, however, the repetition durability of the reversible thermosensitive recording layer deteriorates. Such a conventional recording medium Q or S, in which the magnetic recording layer 5 is provided on the protective layer 4 lacks reliability in terms of the repetition durability because the magnetic recording layer 5 is easily peeled from the protective layer 4 or readily takes scratches to impair the functions of the magnetic recording layer 5 when the recording medium is only used several times.

A recording medium R as shown in FIG. 9, which is the same as disclosed in Japanese Laid-Open Patent Application 3-130188, comprises a support 1, and a magnetic recording layer 9, a smoothening layer 11, a light reflection layer 2, a reversible thermosensitive recording layer 3 and a protective layer 4 which are successively overlaid on the support 1. In this case, the protective layer 4, the reversible thermosensitive recording layer 3, the light reflection layer 2 and the smoothening layer 11 hinder the operation for writing information in the magnetic recording layer 9 and reading the information therefrom by use of a magnetic head. To prevent the errors due to the decrease of magnetic output from occurring, it is necessary to decrease the total thickness of the above-mentioned layers 4, 3, 2, and 11 to 5 µm or less.

SUMMARY OF THE INVENTION

It is therefore a first object of the present invention to provide a reversible thermosensitive recording medium comprising a support, and a reversible thermosensitive recording layer and a magnetic recording layer provided on the same side of the support, free from the previously mentioned conventional shortcomings which occur when the recorded information is output, with the image forming performance of the reversible thermosensitive recording layer and the recording output performance of the magnetic recording layer being improved, and the reliability and the durability of the magnetic recording layer being enhanced.

A second object of the present invention is to provide a method of producing a reversible thermosensitive recording medium comprising a reversible thermosensitive recording layer, and a magnetic recording layer provided on the reversible thermosensitive recording layer, with excellent repetition durability.

The first object of the present invention can be achieved by a reversible thermosensitive recording medium comprising a support, a reversible thermosensitive recording layer formed on the support, comprising a matrix resin and an organic low-molecular-weight material dispersed in the matrix resin, capable of reversibly assuming a transparent state and a white opaque state depending on the temperature thereof, and a magnetic recording layer which is integrally provided in a part of the reversible thermosensitive recording layer.

Alternatively, the first object of the present invention can also be achieved by a reversible thermosensitive recording medium comprising a support, a reversible thermosensitive recording layer formed on the support, comprising a matrix resin and an organic low-molecular-weight material dispersed in the matrix resin, capable of reversibly assuming a transparent state and a white opaque state depending on the temperature thereof, an anchor layer provided on the reversible thermosensitive recording layer, and a magnetic recording layer which is integrally provided in a part of the anchor layer.

In the above-mentioned case, it is preferable that the anchor layer comprise at least one polymer selected from the group consisting of polyvinyl chloride, polyester, polyethylene, polypropylene, polystyrene, polyacrylate, polyacrylamide, polyamide, polyvinyl pyrrolidone, a natural rubber, polysiloxane, polyvinyl alcohol, polyacrolein, and a copolymer comprising at least one monomer constituting the above-mentioned polymers.

Each of the above-mentioned reversible thermosensitive recording media may further comprise a protective layer which is provided so as to cover a portion of the reversible thermosensitive recording layer or anchor layer which is not covered with the magnetic recording layer, or so as to cover the magnetic recording layer and a portion of the reversible thermosensitive recording layer or anchor layer which is not covered with the magnetic recording layer. In this case, it is preferable that the protective layer comprise an ultraviolet-curing resin or an electron radiation curing resin.

In addition, each of the above-mentioned reversible thermosensitive recording media may further comprise a light reflection layer or a colored layer which is provided between the support and the reversible thermosensitive recording layer.

Furthermore, each of the above-mentioned reversible thermosensitive recording media may further comprise another magnetic recording layer which is at least partially provided on the back side of the support, opposite to the reversible thermosensitive recording layer with respect to the support. In this case, a protective layer may be provided so as to cover a portion of the back side of the support which is not covered with the magnetic recording layer, or so as to cover the magnetic recording layer, and if any, a portion of the back side of the support which is not covered with the magnetic recording layer. In this case, it is preferable that the protective layer may comprise an ultraviolet-curing resin or an electron radiation curing resin.

The second object of the present invention is achieved by a method of producing a reversible thermosensitive recording medium comprising (a) a support, (b) a reversible thermosensitive recording layer formed on the support, comprising a matrix resin and an organic low-molecular-weight material dispersed in the matrix resin, capable of reversibly assuming a transparent state and a white opaque state depending on the temperature thereof, and (c) a magnetic recording layer which is integrally provided in a part of the reversible thermosensitive recording layer, comprising a step of fusion-bonding the magnetic recording layer to the reversible thermosensitive recording layer by using a heating medium which has a heating portion with substantially the same width as the width of the magnetic recording layer.

Further, the second object of the present invention can be achieved by a method of producing a reversible thermosensitive recording medium comprising (a) a support, (b) a reversible thermosensitive recording layer formed on the support, comprising a matrix resin and an organic low-molecular-weight material dispersed in the matrix resin, capable of reversibly assuming a transparent state and a white opaque state depending on the temperature thereof, (c) an anchor layer provided on the reversible thermosensitive recording layer, and (d) a magnetic recording layer which is integrally provided in a part of the anchor layer, comprising a step of fusion-bonding the magnetic recording layer to the anchor layer by using a heating medium which has a heating portion with substantially the same width as the width of the magnetic recording layer.

In the case where the fusion-bonding step is carried out, it is preferable to use as the heating medium a roll heater having a heating portion with substantially the same width as the width of the magnetic recording layer.

Alternatively, the magnetic recording layer may be integrally provided in a part of the reversible thermosensitive recording layer or the anchor layer by a step of applying or transferring the magnetic recording layer to the reversible thermosensitive recording layer or the anchor layer. In this case, it is preferable that a concave portion be provided on the surface of the reversible thermosensitive recording layer or anchor layer on which the magnetic recording layer is provided.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a diagram in explanation of the change of transparency of a reversible thermosensitive recording layer for use in a recording medium of the present invention depending on the temperature thereof;

DETAILED DESCRIPTION OF THE PREFERRED EMBODIMENTS

Figure 2A:
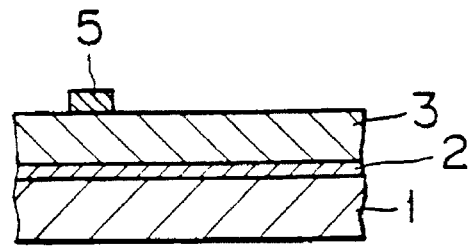
FIGS. 2 through 8 show schematic cross-sectional views of reversible thermosensitive recording media according to the present invention, in explanation of the structure of layers.

As a result of intensive studies on the reversible thermosensitive recording medium, the inventors of the present invention have found that when a magnetic recording layer is integrally provided in a part of a reversible thermosensitive recording layer, or an anchor layer is provided on the reversible thermosensitive recording layer and the magnetic recording layer is integrally provided in a part of the anchor layer, the adhesion of the magnetic recording layer to the layer provided thereunder is increased to improve the durability of the magnetic recording layer. In this case, the reversible thermosensitive recording layer can be designed to have a sufficient thickness, so that the image density of images formed on the reversible thermosensitive recording layer can be satisfactorily increased. Furthermore, when a protective layer is provided on the magnetic recording layer, not only the magnetic recording layer can be prevented from being scratched by a magnetic head, but also the adhesion of the magnetic recording layer to the under layer can be further increased. Thus, the durability of the magnetic recording layer can be further improved.

The most important feature of the reversible thermosensitive recording medium of the present invention is that the magnetic recording layer is integrally provided in a part of the reversible thermosensitive recording layer or the anchor layer. Therefore, the magnetic recording layer can be prevented from being peeled from the layer provided thereunder even if the magnetic recording layer is the outer layer, thereby improving the durability of the magnetic recording layer. In addition, the magnetic recording layer can exhibit high durability even though the magnetic recording layer is provided on the reversible thermosensitive recording layer. This makes it possible to provide a recording medium capable of showing high reliability in record forming performance and record output performance, and exhibiting high reliability and durability.

The magnetic recording layer can be integrally provided in a part of the reversible thermosensitive recording layer by applying the magnetic recording layer to the reversible thermosensitive recording layer. In this case, the integral structure can be attained by improving the adhesion between the magnetic recording layer and the reversible thermosensitive recording layer. In light of the adhesion between two recording layers, it is preferable to employ as a binder resin for use in the magnetic recording layer a resin having a strong affinity for the matrix resin for use in the reversible thermosensitive recording layer. When the binder resin for use in the magnetic recording layer has not so much affinity for the matrix resin for use in the reversible thermosensitive recording layer, an anchor layer may be provided on the reversible thermosensitive recording layer using a resin which has strong affinities for both the binder resin for use in the magnetic recording layer and the matrix resin for use in the reversible thermosensitive recording layer, and the magnetic recording layer may be integrally provided in a part of the anchor layer.

To ensure the integral structure of the magnetic recording layer and the layer provided thereunder by improving the adhesion therebetween, it is preferable that the magnetic recording layer comprise a binder resin, and finely-divided particles of a magnetic material such as ferrite which are thoroughly dispersed in the binder resin.

Examples of the binder resin for use in the magnetic recording layer are polyester resin, polyurethane resin, vinyl chloride-vinyl acetate copolymer, acrylic resin and polyvinyl alcohol resin.

Examples of the resin having a strong affinity for the above-mentioned binder resins include vinyl acetate resin, a copolymer of vinyl acetate and an acrylic monomer, acrylic resin and vinyl chloride resin.

In the present invention, the magnetic recording layer can be integrally provided in a part of the reversible thermosensitive recording layer or the anchor layer not only by a step of applying, but also a step of transferring the magnetic recording layer to the reversible thermosensitive recording layer or the anchor layer, with good adhesion therebetween taken into consideration. In order to further decrease the peeling problem of the magnetic recording layer and increase the reliability of the recording medium it is preferable that concave portions be provided on the surface of the reversible thermosensitive recording layer or the anchor layer, for example, by thermal compression, and the magnetic recording layer be integrally provided on the above-mentioned concave portions, as illustrated in recording media A' and B' in FIG. 2 and recording media D' and E' in FIG. 3. In particular, the reliability of the reversible thermosensitive recording media B' and E' of the present invention can be remarkably improved because the magnetic recording layer can be prevented from being peeled or scratched in the repeated operations owing to the protective layer provided on the magnetic recording layer.

Figure 10:
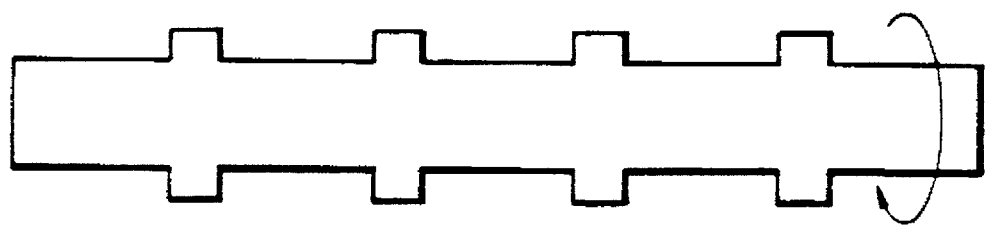
FIG. 10 is a schematic diagram of one example of a heating medium used for producing a reversible thermosensitive recording medium of the present invention.
Figure 11:
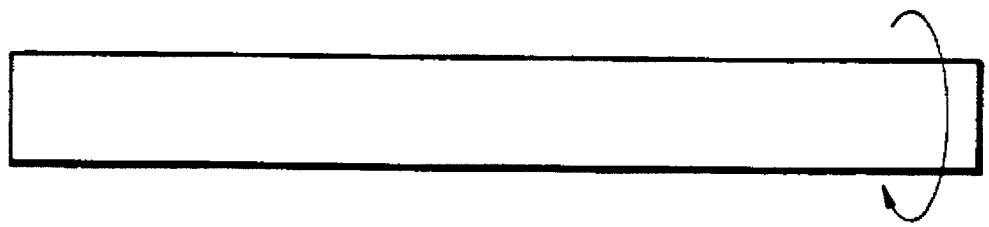
FIG. 11 is a schematic diagram of one example of a heating medium conventionally used for producing a reversible thermosensitive recording medium.

The magnetic recording layer can be integrally provided in a part of the reversible thermosensitive recording layer or the anchor layer by a step of fusion-bonding, using a heating medium which has a heating portion with substantially the same width as the width of the magnetic recording layer. For example, a roll heater as shown in FIG. 10 is preferably employed as the heating medium. The roll heater as shown in FIG. 10 has protrusions on the surface thereof. Since the width of each protrusion is designed to be substantially the same as that of the magnetic recording layer, the magnetic recording layer can be easily provided at predetermined positions on the reversible thermosensitive recording layer or the anchor layer. In contrast to this, when the magnetic recording layer is fusion-bonded to the reversible thermosensitive recording layer using a roll heater as shown in FIG. 11 which doesn't have any protrusion, some changes are unfavorably induced in the reversible thermosensitive recording layer in the course of the formation of the magnetic recording layer.

In the present invention, consideration must be given to the structure of the layers, especially the location of the magnetic recording layer and the reversible thermosensitive recording layer, in order to sufficiently improve the record forming performance and the record output performance of both of the magnetic recording layer and the reversible thermosensitive recording layer. Preferable embodiments of the reversible thermosensitive recording medium according to the present invention are illustrated in FIGS. 2 through 8.

Each of reversible thermosensitive recording media A, B and C according to the present invention as shown in FIG. 2 comprises a support 1, a light reflection layer 2 provided on the support 1, a reversible thermosensitive recording layer 3 provided on the light reflection layer 2, and a magnetic recording layer 5 which is integrally provided in a part of the reversible thermosensitive recording layer 3, for example, by transferring a magnetic film provided on a thermal transfer ribbon to the reversible thermosensitive recording layer 3 with the application of heat thereto. The recording medium B further comprises a protective layer 4 which is provided so as to cover the magnetic recording layer 5 and portions of the reversible thermosensitive recording layer 3 which are not covered with the magnetic recording layer 5. In the recording medium C, in contrast to this, a protective layer 4 is only provided so as to cover the portions of the reversible thermosensitive recording layer 3 which are not covered with the magnetic recording layer 5.

The structures of the recording media A' and B' are respectively almost the same as those of the recording media A and B except that a reversible thermosensitive recording layer 3 has a concave portion on the surface thereof and a magnetic recording layer 5 is integrally provided on the concave portion.

The structures of reversible thermosensitive recording media D, E and F according to the present invention as shown in FIG. 3 are respectively the same as those of the recording media A, B and C except that an anchor layer 6 is provided on the reversible thermosensitive recording layer 3, and the magnetic recording layer 5 is integrally provided in a part of the anchor layer 6. Owing to the provision of the anchor layer 6, the durability of the magnetic recording layer 5 becomes higher as compared with the recording media A, B and C shown in FIG. 2.

The structures of the recording media D' and E' are respectively almost the same as those of the recording media D and E except that an anchor layer 6 has a concave portion on the surface thereof and a magnetic recording layer 5 is integrally provided on the concave portion.

Figure 3A:
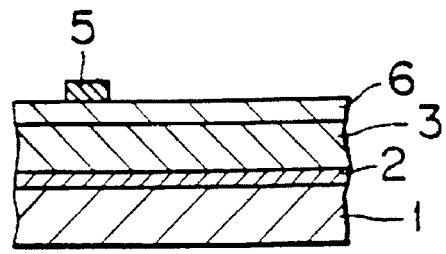
Figure 3B:
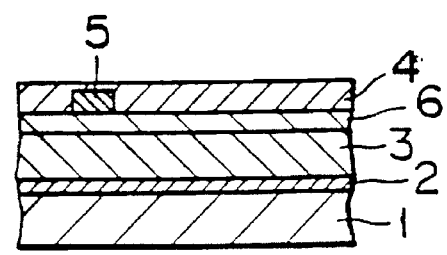
Figure 3C:
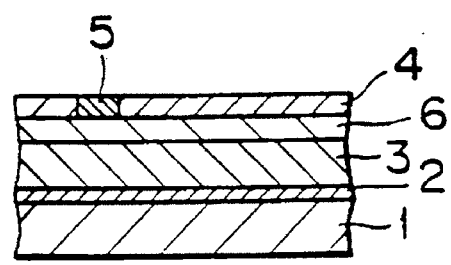
Figure 3D:
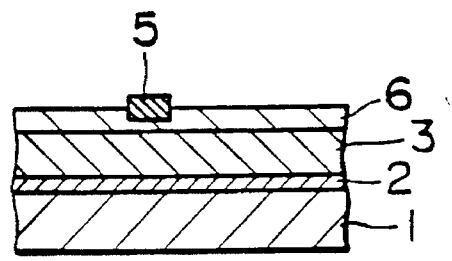
Figure 3E:
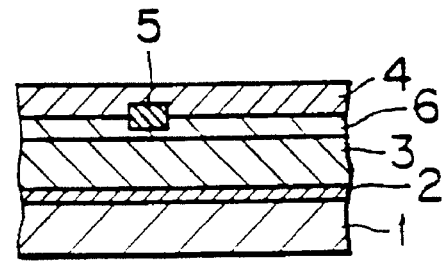
Figure 4A:
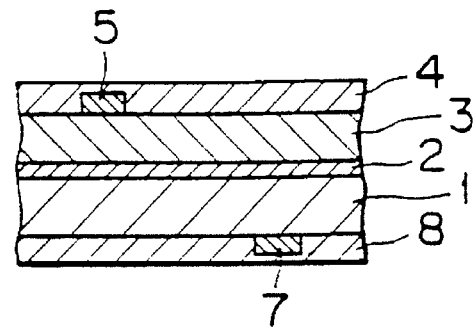
Figure 4B:
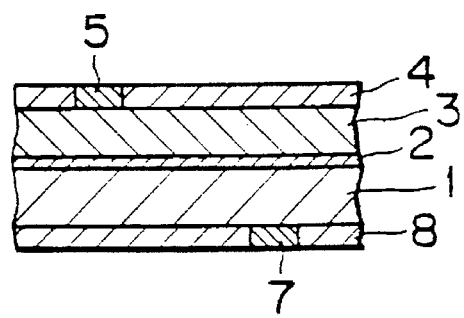
Figure 5A:
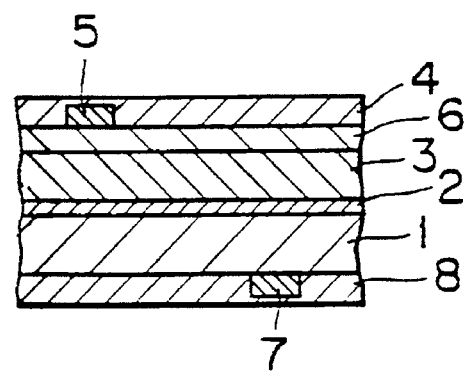
Figure 5B:
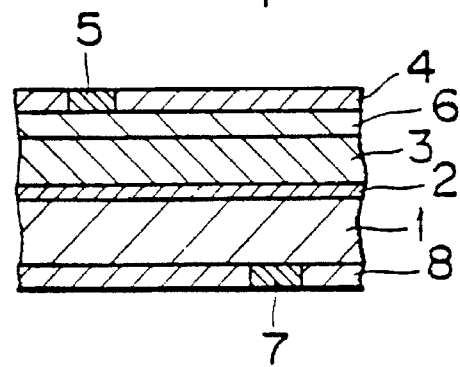

In recording media as shown in FIGS. 4 and 5 there is partially provided a magnetic recording layer 7 on the back side of the support 1, that is, opposite to the reversible thermosensitive recording layer 2 with respect to the support 1. The layers provided on the front side of a support 1 of recording media G and H as shown in FIG. 4 have respectively the same structures as those of the recording media B and C as shown in FIG. 2. Further, the structures of the layers provided on the front side of a support 1 of recording media I and J shown in FIG. 5 are respectively the same as those of the recording media E and F as shown in FIG. 3. A protective layer 8 is provided so as to cover the magnetic recording layer 7 and a portion of the back side of the support 1 which is not covered with the magnetic recording layer 7 in the recording media G and I. In the recording media H and J, the protective layer 8 is provided so as to cover a portion of the back side of the support 1 which is not covered with the magnetic recording layer 7.

Figure 6A:
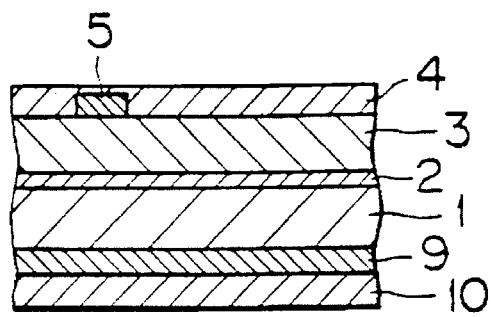
Figure 6B:
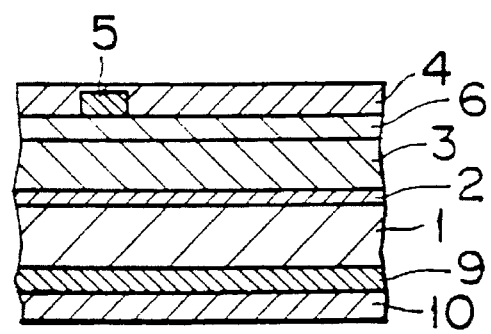

The feature of reversible thermosensitive recording media K and L according to the present invention as shown in FIG. 6 is that a magnetic recording layer 9 and a protective layer 10 are successively provided on the entire back surface of a support 1. The protective layer 10 used in the recording media K and L serves to prevent the magnetic recording layer 9 from being shaved by a magnetic head, and to increase the adhesion between the support 1 and the magnetic recording layer 9. The structures of the layers provided on the front surface of the support 1 of the recording media K and L as shown in FIG. 6 are respectively the same as those of the recording medium G of FIG. 4 and the recording medium I of FIG. 5.

Figure 7A:
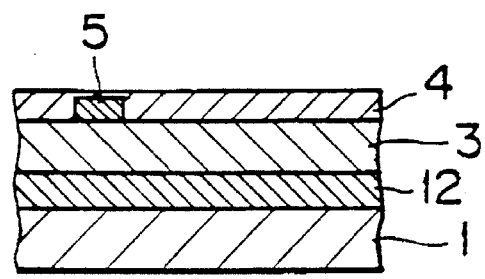
Figure 7B:
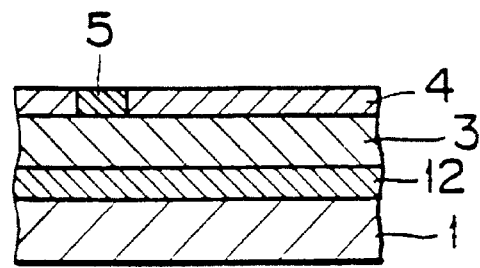

Reversible thermosensitive recording media M and N as shown in FIG. 7 are respectively the same as the recording media B and C of FIG. 2 except that the light reflection layer 2 for use in the recording media B and C is replaced by a colored layer 12.

Figure 8A:
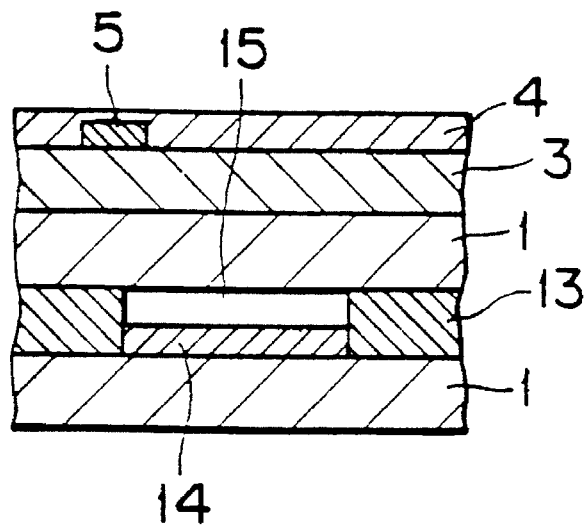
Figure 8B:
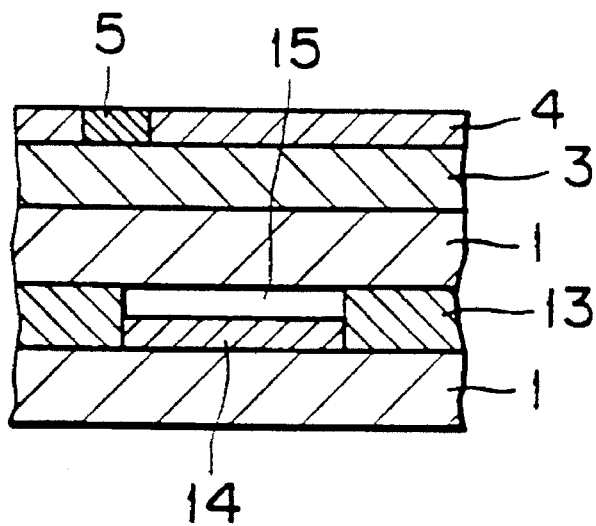

In each of reversible thermosensitive recording media O and P according to the present invention as shown in FIG. 8, a reversible thermosensitive recording layer 3 is overlaid on a transparent support 1, and a magnetic recording layer 5 is integrally provided in a part of the reversible thermosensitive recording layer 3. A protective layer 4 of the reversible thermosensitive recording medium O is thoroughly overlaid so as to cover the magnetic recording layer 5 and a portion of the reversible thermosensitive recording layer 3 which is not covered with the magnetic recording layer 5, while a protective layer 4 of the reversible thermosensitive recording medium P is provided so as to cover a portion of the reversible thermosensitive recording layer 4 which is not covered with the magnetic recording layer 5. In addition, each of the reversible thermosensitive recording media O and P comprises another support 1 which partially bears a colored printing layer 14 thereon. To prepare such a recording medium, the back surface of the transparent support 1 is attached to another support 1 via an adhesive layer 13. In this case, no adhesive is applied to the colored printing layer 14, so that there is formed an air space layer between the transparent support 1 and the colored printing layer 14.

As previously mentioned, the magnetic recording layer for use in the reversible thermosensitive recording medium of the present invention comprises a binder resin and finely-divided particles of a magnetic material such as ferrite which are uniformly dispersed in the binder resin. Not only the previously mentioned resins, but also any resins for use in the conventional magnetic recording layer can be used as the binder resins. In the present invention, to integrally provide the magnetic recording layer in a part of the layer provided thereunder, a commercially available magnetic film transfer ribbon can be employed. The coercive force of the magnetic film transfer ribbon may be selected depending on the specifications of the magnetic reader to be employed. When the magnetic layer is thermally transferred to the surface of the reversible thermosensitive recording layer from the transfer ribbon, it is preferable that the transfer ribbon be heated to 100° to 140° C. By maintaining the temperature within the above-mentioned range, a sufficient adhesion is generated between the obtained magnetic recording layer and the reversible thermosensitive recording layer, without causing the reversible thermosensitive recording layer to deteriorate.

The magnetic recording layer obtained by transferring from the commercially available magnetic film transfer ribbon comprises polyurethane resin, polyester resin, or vinyl chloride-vinyl acetate copolymer as a binder resin; and vinyl acetate resin, acrylic resin or vinyl chloride resin which is transferred from a surface layer of the magnetic film transfer ribbon as a pressure-sensitive adhesive. The thickness of the magnetic recording layer including the above-mentioned pressure-sensitive adhesive layer is generally in a range of 5 to 20 μm. When the thickness of the magnetic recording layer is within the above-mentioned range, thermal energy can be uniformly applied to the reversible thermosensitive recording layer by a thermal head, so that high quality images can be formed on the reversible thermosensitive recording layer, and in addition, the decrease of magnetic output from the magnetic recording layer can be prevented, so that the occurrence of errors can be avoided.

In the present invention, to achieve the integral structure of the magnetic recording layer and the reversible thermosensitive recording layer or the anchor layer, it is desirable that much attention be paid to the following points:

(1) not to cause the support to become creased;

(2) to make the applied coating liquid for the magnetic recording layer uniform; and (3) to smoothen the obtained magnetic recording layer.

Further, it is preferable that the surface of the obtained reversible thermosensitive recording medium according to the present invention be made smooth. The reasons for this are that the surface of the recording medium can be prevented from being scratched by the magnetic reader and the thermal head, and the distance between the magnetic recording layer and the magnetic reader or writer can be maintained at about 10 μm or less in order to accurately write and read the magnetic recording. In light of the surface smoothness of the recording medium, it is apparent that the recording media C and F are preferable to the recording media A and D. Namely, the recording media C and F have many advantages from the viewpoint of surface smoothness because the surface of each recording medium is made smooth by the provision of the protective layer even though the protective layer is not provided on the magnetic recording layer.

The anchor layer is a resin layer to enhance the adhesion between the reversible thermosensitive recording layer and the magnetic recording layer. Therefore, a resin having a good adhesion to the resins for use in the reversible thermosensitive recording layer and the magnetic recording layer may be used for the anchor layer.

It is preferable that the anchor layer comprise at least one polymer selected from the group consisting of polyvinyl chloride, polyester, polyethylene, polypropylene, polystyrene, polyacrylate, polyacrylamide, polyamide, polyvinyl pyrrolidone, a natural rubber, polysiloxane, polyvinyl alcohol, polyacrolein, and a copolymer comprising at least one monomer constituting the above-mentioned polymers.

The anchor layer can be provided on the reversible thermosensitive recording layer by dissolving the above-mentioned resin in a solvent to prepare a coating liquid for the anchor layer and coating the thus obtained coating liquid and drying the same. It is preferable that the thickness of the anchor layer be in a range of 0.5 to 3 μm on a dry basis. When the thickness of the anchor layer is within the above-mentioned range, sufficient adhesion between the anchor layer and the magnetic recording layer can be obtained, and the decrease of thermal sensitivity of the reversible thermosensitive recording layer can be prevented.

The reversible thermosensitive recording layer comprises as the main components a matrix resin and an organic low-molecular-weight material uniformly dispersed in the matrix resin. The thickness of the reversible thermosensitive recording layer is in a range of 2 to 20 μm, preferably in a range of 5 to 15 μm. The reversible thermosensitive recording layer has the property that the transparency changes from a transparent state to a white opaque state, and vice versa, depending on the temperature thereof. Any reversible thermosensitive recording layer for use in the conventional reversible thermosensitive recording media can be employed, and the temperature range in which the reversible thermosensitive recording layer assumes a transparent state can be controlled by changing the kind of organic low-molecular-weight material employed in the layer. The difference between the transparent state and the white opaque state of the reversible thermosensitive recording layer is considered to be based on the following principle:

(i) In the transparent state, the organic low-molecular-weight material dispersed in the matrix resin consists of relatively large crystals, so that the light which enters the crystals from one side passes therethrough to the opposite side, without being scattered, thus the reversible thermosensitive recording layer appears transparent.

(ii) In the milky white opaque state, the organic low-molecular-weight material is composed of polycrystals consisting of numerous small crystals, with the crystallographic axis pointed to various directions, so that the light which enters the reversible thermosensitive recording layer is scattered a number of times at the interfaces of the crystals of the organic low-molecular-weight material. As a result, the thermosensitive recording layer becomes opaque in a milky white color.

The reversible change between the transparent state and the white opaque state of the reversible thermosensitive recording layer depending on the temperature thereof will now be explained by referring to FIG. 1.

In FIG. 1, it is supposed that the reversible thermosensitive recording layer is initially in a milky white opaque state at room temperature $T_0$ or below. When the thermosensitive recording layer is heated to temperature $T_2$, the thermosensitive recording layer becomes transparent. Thus, the recording layer reaches a maximum transparent state at temperature $T_2$. Even if the recording layer which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording layer in the maximum transparent state is further heated to temperature $T_3$ or more, it assumes a medium state which is between the maximum transparent state and the maximum milky white opaque state. When the recording layer in the medium state at temperature $T_3$ or more is cooled to room temperature $T_0$ or below, the recording layer returns to the original maximum opaque state, without passing through any transparent state. It is considered that this is because the organic low-molecular-weight material is melted when heated to temperature $T_3$ or above, and the polycrystals of the organic low-molecular-weight grow and separate out when it is cooled. If the recording layer in the milky white opaque state is heated to any temperature between temperature $T_1$ and temperature $T_2$, and then cooled to room temperature $T_0$ or below, the recording layer assumes an intermediate state between the transparent state and the milky white opaque state.

When the recording layer in the transparent state at room temperature $T_0$ is again heated to temperature $T_3$ or above, and then cooled to room temperature $T_0$, the recording layer returns to the milky white opaque state. Thus, the reversible thermosensitive recording layer for use in the present invention can assume a milky white opaque state, a transparent state and an intermediate state between the aforementioned two states at room temperature.

Therefore, a milky white opaque image can be obtained on a transparent background, or a transparent image can also be obtained on a milky white opaque background by selectively applying the thermal energy to the reversible thermosensitive recording layer for use in the present invention. Such image formation and erasure can be repeated many times. Further, when a colored layer is disposed on the back side of the reversible thermosensitive recording layer, a color image can be obtained on a white opaque background, or a white opaque image can be obtained on a colored background. In addition, a dark portion and a light portion respectively corresponding to the white opaque portion and the transparent portion of the recording layer are formed on a screen when the images obtained on the reversible thermosensitive recording layer are projected on the screen by use of an overhead projector (OHP). When the image obtained on the reversible thermosensitive recording layer is used as the reflection image as mentioned above, the contrast of the obtained image can be increased by disposing a light reflection layer on the back side of the reversible thermosensitive recording layer even if the thickness of the reversible thermosensitive recording layer is decreased.

To form the reversible thermosensitive recording layer, (1) a solution in which both the matrix resin and the organic low-molecular-weight material are dissolved, or (2) a dispersion prepared by dispersing the finely-divided particles of the organic low-molecular-weight material in a matrix resin solution may be coated on the lower layer, and then dried. In the case where the above-mentioned dispersion (2) is used for the formation of the reversible thermosensitive recording layer, a solvent which does not dissolve at least one organic low-molecular-weight material therein is used for the matrix resin solution.

The solvent used in the coating liquid for the reversible thermosensitive recording layer can be selected depending on the kind of matrix resin and the type of organic low-molecular-weight material to be employed. For example, solvents such as tetrahydrofuran, methyl ethyl ketone, methyl isobutyl ketone, chloroform, carbon tetrachloride, ethanol, toluene and benzene can be employed. Not only when the matrix resin dispersion (2) is used, but also when the matrix resin solution (1) is used, the organic low-molecular-weight material are dispersed in the form of finely-divided particles in the matrix resin in the reversible thermosensitive recording layer.

The matrix resin is a material which forms a reversible thermosensitive recording layer in which finely-divided particles of the organic low-molecular-weight material are uniformly dispersed, and affects the transparency of the recording layer when the recording layer is in a maximum transparent state. Therefore, it is preferable that the matrix resin have high transparency, mechanical stability and excellent film forming properties.

Examples of such a resin include vinyl chloride resin; vinyl chloride copolymers such as vinyl chloride-vinyl acetate copolymer, vinyl chloride-vinyl acetate-vinyl alcohol copolymer, vinyl chloride-vinyl acetate-maleic acid copolymer and vinyl chloride-acrylate copolymer; vinylidene chloride resin; vinylidene chloride copolymers such as vinylidene chloride-vinyl chloride copolymer and vinylidene chloride-acrylonitrile copolymer; polyester; polyamide; styrene-butadiene copolymer; polyacrylate, polymethyacrylate and acrylate-methyacrylate copolymer; and silicone resin. These resins can be used alone or in combination.

The organic low-molecular-weight material for use in the reversible thermosensitive recording layer may appropriately be selected from the materials which are changeable from the polycrystalline state to the single crystalline state in accordance with each of the desired temperatures ranging from $T_0$ to $T_3$ as shown in FIG. 1. It is preferable that the organic low-molecular-weight material for use in the present invention have a melting point ranging from 30° to 200° C., more preferably from about 50° to 150° C.

Examples of the organic low-molecular-weight material for use in the present invention are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids and saturated or unsaturated dicarboxylic acids, and esters, amides and ammonium salts thereof; saturated or unsaturated halogenated fatty acids and esters, amides and ammonium salts thereof; arylcarboxylic acids, and esters, amides and ammonium salts thereof; halogenated arylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination.

It is preferable that the number of carbon atoms of the above-mentioned organic low-molecular-weight material be in a range of 10 to 60, more preferably in a range of 10 to 38, further preferably in a range of 10 to 30. Part of the alcohol groups in the esters may be saturated or unsaturated, and further may be substituted by a halogen. In any case, it is preferable that the organic low-molecular-weight material have at least one atom selected from the group consisting of oxygen, nitrogen, sulfur and a halogen in its molecule. More specifically, it is preferable the organic low-molecular-weight materials comprise, for instance, —OH, —COOH, —CONH—, —COOR, —NH—, —NH$_2$, —S—, —S—S—, —O— or a halogen atom.

Specific examples of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid, and oleic acid; esters of higher fatty acids such as methyl stearate, tetradecyl stearate, octadecyl stearate, octadecyl laurate, tetradecyl palmitate and dodecyl behenate; ethers such as $O(C_{16}H_{33})_2$, $O(C_2H_4$—O—CO—$C_{11}H_{23})_2$, $O(C_2H_4$—O—CO—$C_{17}H_{35})_2$, and $O[C_2H_4$—O—CO—$(CH_2)_{15}$—$CH(CH_3)$—$C_2H_5]_2$; thioethers such as $S(C_{12}H_{25})_2$, $S(C_{16}H_{33})_2$, $S(C_{18}H_{37})_2$, $S(C_{19}H_{39})_2$, $S(C_2H_4$—O—CO—$C_{12}H_{25})_2$, $S(C_2H_4$—O—CO—$C_{18}H_{37})_2$, and $S[C_2H_4$—O—CO—$(CH_2)_{15}$—$CH(CH_5)$—$C_2H_5]_2$; disulfides such as $C_{12}H_{25}$—S—S—$C_{12}H_{25}$; and imino compounds such as $NH(C_2H_4$—O—CO—$C_{18}H_{37})_2$, and $NH[CH_2$—O—CO—$(CH_2)_{15}$—$CH(CH_3)$—$C_2H_5]_2$.

Of these, higher fatty acids having 16 or more carbon atoms, more preferably having 16 to 24 carbon atoms, such as palmitic acid, stearic acid, behenic acid and lignoceric acid are preferred in the present invention.

To extend the temperature range where the reversible thermosensitive recording layer maintains the transparent state, the above-mentioned organic low-molecular-weight materials may appropriately be used in combination. Alternatively, the above-mentioned organic low-molecular-weight material may be used in combination with other materials having different melting points, as disclosed in Japanese Laid-Open Patent Applications 63-39378, 63-130380, 2-1363 and 3-2089.

It is preferable that the weight of the matrix resin be in a range of 0.5 to 16 times, more preferably 2 to 8 times, the weight of the organic low-molecular-weight material in the reversible thermosensitive recording layer. When the ratio of the matrix resin to the organic low-molecular-weight material is within the above range, the matrix resin can form a film in which the organic low-molecular-weight material is uniformly dispersed in the form of finely-divided particles, and the obtained recording layer can readily reach the maximum white opaque state.

In the reversible thermosensitive recording layer for use in the present invention, additives such as a surface active agent and a high-boiling point solvent can be employed to facilitate the formation of a transparent image.

Specific examples of the high-boiling point solvent are tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di- 2-ethylhexyl azelate, dibutyl sebacate, di-2-ethylhexyl sebacate, diethylene glycol dibenzoate, triethylene glycol, di-2-ethyl butyrate, methyl acetylricinoleate, butyl acetylricinoleate, butylphthalyl butyl glycolate and tributyl acetylcitrate.

Specific examples of the surface active agent are polyhydric alcohol higher fatty acid esters; polyhydric alcohol higher alkyl ethers; lower olefin oxide adducts of polyhydric alcohol higher fatty acid ester, higher alcohol, higher alkylphenol, higher fatty acid, higher alkylamine, higher fatty amide, fat and oil and polypropylene glycol; acetylene glycol; sodium, calcium, barium and magnesium salts of higher alkyl benzene-sulfonic acid; calcium, barium and magnesium salts of higher fatty acid, aromatic carboxylic acid, higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; copolymer of long-chain alkyl methacrylate and amine-containing monomer; styrene—maleic anhydride copolymer; and olefin—maleic anhydride copolymer.

The protective layer for use in the present invention may comprise a silicone rubber, silicone resin (described in Japanese Laid-Open Patent Application 63-221087), a polysiloxane graft polymer (described in Japanese Laid-Open Patent Application 63-317385), or an ultraviolet-curing resin or electron radiation curing resin (described in Japanese Laid-Open Patent Application 2-566). In particular, the curing resins such as the ultraviolet-curing resin and electron radiation curing resin are preferably employed as the materials for use in the protective layer.

It is preferable that the thickness of the protective layer be in a range of 0.5 to 6 µm, more preferably in a range of 1.5 to 4.5 µm. When the thickness of the protective layer is within the above range, high durability of the recording medium can be obtained without decreasing the thermal sensitivity of the reversible thermosensitive recording layer.

To prepare the protective layer, any of the above-mentioned resins with high heat resistance and mechanical strength or a prepolymer of such a resin is dissolved in a solvent to prepare a coating liquid, and thus prepared coating liquid is coated on a portion of the reversible thermosensitive recording layer which is not covered with the magnetic recording layer, or coated on such a portion of the reversible thermosensitive recording layer and the magnetic recording layer. Then, the coating liquid was dried, and cured when necessary. It is desirable that the matrix resin and the organic low-molecular-weight material for use in the reversible thermosensitive recording layer be not easily dissolved in the solvent for use in the protective layer.

Preferable examples of the above-mentioned solvent for use in a coating liquid for the protective layer include n-hexane, methyl alcohol, ethyl alcohol and isopropyl alcohol. In particular, alcohol-based solvents are preferred from the viewpoint of cost.

The protective layer for use in the present invention may further comprise a silicone oil, a fluoro-plastic, and inorganic or organic filler to improve the transporting properties and the blocking resistance of the obtained recording medium.

The support for use in the reversible thermosensitive recording medium of the present invention may be transparent, or not. Any material that can hold the thermosensitive recording layer and the magnetic recording layer thereon is available, and for example, a glass plate, a sheet of paper or synthetic paper, a plastic film and a metallic plate may be employed for the support.

The light reflection layer for use in the present invention is disposed on the back side of the reversible thermosensitive recording layer to reflect the light. In general, the light reflection layer can be prepared by deposition of a metal such as aluminum, nickel or tin in accordance with the convention method, for instance, vacuum deposition, ion plating, sputtering or chemical vapor deposition (CVD) so as to have a thickness of about 200 to 1,000 Å.

The colored layer for use in the present invention comprises a coloring agent and a binder resin. By the provision of the colored layer, the image obtained on the reversible thermosensitive recording layer can be recognized as a colored image, so that the coloring agent capable of producing a desired color may be employed.

The colored layer may be prepared by coating a coating liquid which is prepared by dispersing or dissolving the binder resin and the coloring agent in a solvent, or sticking a colored sheet and the support together. The thickness of the colored layer is in a range of 0.5 to 5 μm, preferably in a range of 1 to 3 μm.

The colored printing layer, which is provided on the support, is a thin layer with a thickness of 0.5 to 2 μm and carries information thereon printed by the conventional printing method. The information may freely include the usage of a card and some advertisement when the recording medium of the present invention is used as a recording card.

The adhesive layer for use in the recording medium as shown in FIG. 8 is a layer to allow one support bearing the colored printing information thereon and the other support on which the reversible thermosensitive recording layer and the magnetic recording layer are overlaid to stick together. The adhesive for use in the adhesive layer may be an acrylic resin and an epoxy resin. The thickness of the adhesive layer is generally in a range of 10 to 30 μm, so that the air space layer 15 in the recording medium O or P of FIG. 8 has a thickness of 5 to 20 μm.

Other features of this invention will become apparent in the course of the following description of exemplary embodiments which are given for illustration of the invention and are not intended to be limiting thereof.

EXAMPLE 1

Formation of Light Reflection Layer

Aluminum was deposited on a transparent polyethylene terephthalate (PET) film with a thickness of about 188 μm, so that a light reflection layer with a thickness of 600 Å was provided on the support.

Formation of Reversible Thermosensitive Recording Layer

The following components were mixed to prepare a coating liquid for a reversible thermosensitive recording layer:

|  | Parts by weight |
| --- | --- |
| Behenic acid | 7 |
| Eicosanedioic acid | 3 |
| Vinyl chloride-vinyl acetate copolymer (Trademark: "1000MT", made by Denki Kagaku Kogyo K.K.) | 25 |
| Diallyl phthalate | 3 |
| Tetrahydrofuran | 150 |

The thus obtained coating liquid was coated on the above prepared light reflection layer by a wire bar and dried at 90° to 120° C., whereby a reversible thermosensitive recording layer with a thickness of about 10 μm was provided on the light reflection layer.

Formation of Magnetic Recording Layer

A commercially available magnetic-film-provided thermal transfer ribbon made by Dainippon Ink & Chemicals, Incorporated, with a coercive force of 6500 e, a residual magnetic flux density of 1.5 Mx/cm and a squareness ration of 0.8 or more was attached to the above prepared reversible thermosensitive recording layer, with the application of heat thereto by using a roll heater as shown in FIG. 10 which as heated to 120° C., so that the magnetic film was thermally transferred in stripes to the reversible thermosensitive recording layer. Thus, the magnetic recording layer was integrally provided in part of the reversible thermosensitive recording layer, with occupying 15% of the surface area of the reversible thermosensitive recording layer.

Thus obtained magnetic recording layer contained as a binder resin a polyester resin having a mixture of terephthalic acid and isophthalic acid as an acid moiety and ethylene glycol as an alcohol moiety. Further, the magnetic-film-provided transfer ribbon had a 5-μm-thick pressure-sensitive adhesive layer made from polyvinyl chloride resin at a surface portion, so that the magnetic recording layer with a total thickness of 13 μm was joined to the reversible thermosensitive recording layer by the above-mentioned pressure-sensitive adhesive layer.

Formation of Protective Layer

After the formation of the magnetic recording layer on the reversible thermosensitive recording layer, the magnetic recording layer projected in stripes on the reversible thermosensitive recording layer. To make the surface of the recording medium even, a 50% solution of a commercially available ultraviolet-curing resin "C7-157" (Trademark), made by Dainippon Ink & Chemicals, Incorporated, was coated on the surface of the reversible thermosensitive recording layer not covered with the magnetic recording layer and the magnetic recording layer by a wire bar, dried at a temperature between 70° and 90° C., and then irradiated by ultraviolet light. Thus, a protective layer was provided on the surface of the recording medium, so that a reversible thermosensitive recording medium No. 1 according to the present invention was obtained.

Figure 2B:
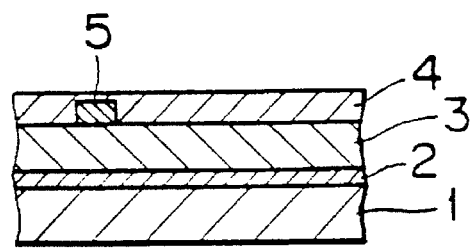

The recording medium No. 1 thus obtained was cut to a predetermined size, whereby a reversible thermosensitive recording card No. 1 with the same structure as that shown in FIG. 2(B) was prepared.

EXAMPLE 2

The procedure for preparation of the reversible thermosensitive recording medium No. 1 in Example 1 was repeated except that a protective layer with a thickness of 4 μm was only provided on a portion of the reversible thermosensitive recording layer which was not covered with the magnetic recording layer, so that a reversible thermosensitive recording medium No. 2 according to the present invention was obtained.

Figure 2C:
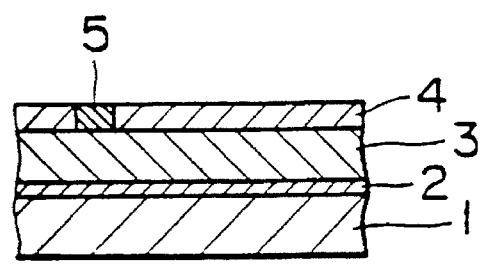
Figure 2D:
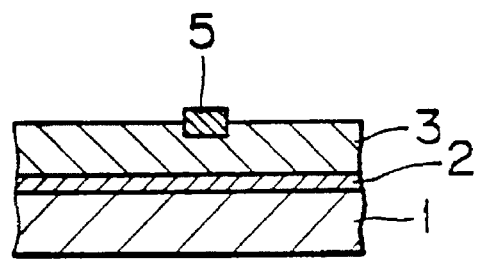
Figure 2E:
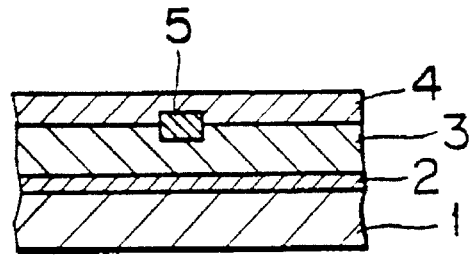

The recording medium No. 2 thus obtained was cut to a predetermined size, whereby a reversible thermosensitive recording card No. 2 with the same structure as that shown in FIG. 2(C) was prepared.

EXAMPLE 3

A light reflection layer and a reversible thermosensitive recording layer were overlaid on a support by the same method as employed in Example 1.

Formation of Anchor Layer

The following components were mixed to prepare a coating liquid for the anchor layer:

| | Parts by weight |
| --- | --- |
| Vinyl chloride-vinyl acetate copolymer (Trademark: "1000P", made by Denki Kagaku Kogyo K.K.) | 10 |
| Methyl ethyl ketone | 45 |
| Toluene | 45 |

The thus obtained coating liquid was coated on the above prepared reversible thermosensitive recording layer and dried, whereby a anchor layer with a thickness of about 2 μm was provided on the reversible thermosensitive recording layer.

A magnetic recording layer was provided in stripes on the above prepared anchor layer by the same method using the same thermal transfer ribbon as employed in Example 1. Thus, the magnetic recording layer was integrally provided in part of the anchor layer.

Then, a protective layer was provided on the surface of the anchor layer which was not covered with the magnetic recording layer and the magnetic recording layer by the same method as employed in Example 1, so that a reversible thermosensitive recording medium No. 3 according to the present invention was obtained.

The recording medium No. 3 thus obtained was cut to a predetermined size, whereby a reversible thermosensitive recording card No. 3 with the same structure as that shown in FIG. 3(E) was prepared.

EXAMPLE 4

The procedure for preparation of the reversible thermosensitive recording medium No. 3 in Example 3 was repeated except that a protective layer with a thickness of 4 μm was only provided on the surface of the anchor layer which was not covered with the magnetic recording layer, so that a reversible thermosensitive recording medium No. 4 according to the present invention was obtained.

The recording medium No. 4 thus obtained was cut to a predetermined size, whereby a reversible thermosensitive recording card No. 4 with the same structure as that shown in FIG. 3(F) was prepared.

EXAMPLE 5

A light reflection layer, a reversible thermosensitive recording layer, a magnetic recording layer (hereinafter referred to as an upper magnetic recording layer), and a protective layer (hereinafter referred to as an upper protective layer) were successively overlaid on a support by the same method as employed in Example 1.

Furthermore, a magnetic recording layer (hereinafter referred to as a lower magnetic recording layer) with a thickness of 13 μm was provided in stripes on the back surface of the support, opposite to the light reflection layer with respect to the support, by the same method as employed in Example 1.

Then, a protective layer (hereinafter referred to as a lower protective layer) was provided so as to cover the back surface of the support which was not covered with the lower magnetic recording layer, and the lower magnetic recording layer by the same method as employed in the formation of the protective layer on the reversible thermosensitive recording layer in Example 1, so that a reversible thermosensitive recording medium No. 5 according to the present invention was obtained.

The recording medium No. 5 thus obtained was cut to a predetermined size, whereby a reversible thermosensitive recording card No. 5 with the same structure as that shown in FIG. 4(G) was prepared.

EXAMPLE 6

The procedure for preparation of the reversible thermosensitive recording medium No. 5 in Example 5 was repeated except that the upper protective layer was provided in a thickness of 4 μm so as to cover the surface of the reversible thermosensitive recording layer not covered with the upper magnetic recording layer, and that the lower protective layer was provided in a thickness of 4 μm so as to cover the back surface of the support not covered with the lower magnetic recording layer, so that a reversible thermosensitive recording medium No. 6 according to the present invention was obtained.

The recording medium No. 6 thus obtained was cut to a predetermined size, whereby a reversible thermosensitive recording card No. 6 with the same structure as that shown in FIG. 4(H) was prepared.

EXAMPLE 7

The procedure for preparation of the reversible thermosensitive recording medium No. 5 in Example 5 was repeated except that an anchor layer was further provided on the reversible thermosensitive recording layer and the upper magnetic recording layer in stripes was integrally provided on the anchor layer by the same method as employed in

19

Example 3, so that a reversible thermosensitive recording medium No. 7 according to the present invention was obtained.

The recording medium No. 7 thus obtained was cut to a predetermined size, whereby a reversible thermosensitive recording card No. 7 with the same structure as that shown in FIG. 5(I) was prepared.

EXAMPLE 8

The procedure for preparation of the reversible thermosensitive recording medium No. 6 in Example 6 was repeated except that an anchor layer was further provided on the reversible thermosensitive recording layer and the upper magnetic recording layer in stripes was integrally provided on the anchor layer by the same method as employed in Example 3, so that a reversible thermosensitive recording medium No. 8 according to the present invention was obtained.

The recording medium No. 8 thus obtained was cut to a predetermined size, whereby a reversible thermosensitive recording card No. 8 with the same structure as that shown in FIG. 5(J) was prepared.

EXAMPLE 9

A light reflection layer, a reversible thermosensitive recording layer, a magnetic recording layer and a protective layer were successively overlaid on a commercially available 188-μm-thick PET film with a magnetic recording layer on the back surface thereof, "DS-1711" (Trademark), made by Dainippon Ink & Chemicals, Incorporated, by the same method as employed in Example 1. The thickness of the above-mentioned magnetic recording layer attached to the back surface of the PET film was 10 μm, the coercive force was 6500 e, the residual magentic flux density was 1.5 Mx/cm and the squareness ratio was 0.8 or more.

Further, a lower protective layer was entirely provided on the above-mentioned lower magnetic recording layer provided on the back surface of the PET film, by the same method as employed in the formation of the protective layer in Example 1, so that a reversible thermosensitive recording medium No. 9 according to the present invention was obtained.

The recording medium No. 9 thus obtained was cut to a predetermined size, whereby a reversible thermosensitive recording card No. 9 with the same structure as that shown in FIG. 6(K) was prepared.

EXAMPLE 10

A light reflection layer, a reversible thermosensitive recording layer, an anchor layer, a magnetic recording layer and a protective layer were successively overlaid by the same method as employed in Example 4 on the same commercially available 188-μm-thick PET film with a magnetic recording layer on the back surface thereof as used in Example 9.

Further, a lower protective layer was entirely provided on the above-mentioned lower magnetic recording layer provided on the back surface of the PET film, by the same method as employed in the formation of the protective layer in Example 1, so that a reversible thermosensitive recording medium No. 10 according to the present invention was obtained.

The recording medium No. 10 thus obtained was cut to a predetermined size, whereby a reversible thermosensitive recording card No. 10 with the same structure as that shown in FIG. 6(L) was prepared.

20

EXAMPLE 11

The procedure for preparation of the reversible thermosensitive recording medium No. 1 in Example 1 was repeated except that the aluminum-deposited light reflection layer was replaced by a colored layer with a thickness of 1 to 2 μm, so that a reversible thermosensitive recording medium No. 11 according to the present invention was obtained. In this case, the colored layer was provided on the support by thoroughly dispersing finely-divided particles of carbon black and dissolving a polyester in a mixed solvent of methyl ethyl ketone and toluene to prepare a coating liquid for the colored layer, and coating the above prepared coating liquid on the support. The polyester for use in the colored layer coating liquid was the same as that employed as the binder resin for use in the commercially available magnetic-film-provided transfer ribbon used in the formation of the magnetic recording layer.

The recording medium No. 11 thus obtained was cut to a predetermined size, whereby a reversible thermosensitive recording card No. 11 with the same structure as that shown in FIG. 7(M) was prepared.

EXAMPLE 12

The procedure for preparation of the reversible thermosensitive recording medium No. 2 in Example 2 was repeated except that the aluminum-deposited light reflection layer was replaced by the same colored layer as employed in Example 11, so that a reversible thermosensitive recording medium No. 12 according to the present invention was obtained.

The recording medium No. 12 thus obtained was cut to a predetermined size, whereby a reversible thermosensitive recording card No. 12 with the same structure as that shown in FIG. 7(N) was prepared.

EXAMPLE 13

Formation of Reversible Thermosensitive Recording Layer

The following components were mixed to prepare a coating liquid for a reversible thermosensitive recording layer:

|  | Parts by weight |
| --- | --- |
| Behenic acid | 7 |
| Eicosanedioic acid | 3 |
| Vinyl chloride-vinyl acetate copolymer (Trademark: "1000MT", made by Denki Kagaku Kogyo K.K.) | 25 |
| Diallyl phthalate | 3 |
| Tetrahydrofuran | 150 |

The thus obtained coating liquid was coated on a transparent PET film (A) with a thickness of about 188 μm by a wire bar and dried at 90° to 120° C., whereby a reversible thermosensitive recording layer with a thickness of about 10 μm was provided on the support.

Then, a magnetic recording layer and a protective layer were successively overlaid on the above prepared reversible thermosensitive recording layer by the same method as employed in Example 1.

A colored printing layer with a thickness of 2 μm was partially provided on a transparent PET film (B) with a thickness of about 188 μm. Then, a polyvinyl chloride resin was applied to the colored-printing-layer-bearing PET film (B) so as to provide an adhesive layer with a thickness of 20 µm made of the polyvinyl chloride resin on a portion of the PET film (B) which was not covered with the colored printing layer. The adhesive layer of the PET film (B) was attached to the back side of the PET film (A), and the laminated PET films (A) and (B) were allowed to stand at 100° C. with the application of a pressure of 2 kg/cm$^2$ thereto for one minute. Thus, a reversible thermosensitive recording medium No. 13 according to the present invention was obtained.

The recording medium No. 13 thus obtained was cut to a predetermined size, whereby a reversible thermosensitive recording card No. 13 with the same structure as that shown in FIG. 8(O) was prepared.

EXAMPLE 14

The procedure for preparation of the reversible thermosensitive recording medium No. 13 in Example 13 was repeated except that a protective layer with a thickness of 4 µm was provided so as to cover the surface of the reversible thermosensitive recording layer which was not covered with the magnetic recording layer, so that a reversible thermosensitive recording medium No. 14 according to the present invention was obtained.

The recording medium No. 14 thus obtained was cut to a predetermined size, whereby a reversible thermosensitive recording card No. 14 with the same structure as that shown in FIG. 8(P) was prepared.

EXAMPLE 15

The procedure for preparation of the reversible thermosensitive recording medium No. 1 in Example 1 was repeated except that there was provided no protective layer, so that a reversible thermosensitive recording medium No. 15 according to the present invention was obtained.

The recording medium No. 15 thus obtained was cut to a predetermined size, whereby a reversible thermosensitive recording card No. 15 with the same structure as that sown in FIG. 2(A) was prepared.

EXAMPLE 16

The procedure for preparation of the reversible thermosensitive recording medium No. 3 in Example 3 was repeated except that there was provided no protective layer, so that a reversible thermosensitive recording medium No. 16 according to the present invention was obtained.

The recording medium No. 16 thus obtained was cut to a predetermined size, whereby a reversible thermosensitive recording card No. 16 with the same structure as that shown in FIG. 3(D) was prepared.

COMPARATIVE EXAMPLE 1

A light reflection layer and a reversible thermosensitive recording layer were successively overlaid on a transparent PET film by the same method as employed in Example 1.

Formation of Protective Layer

A 50% solution of a commercially available ultraviolet-curing resin "C7-157" (Trademark), made by Dainippon Ink & Chemicals, Incorporated, was coated on the above prepared reversible thermosensitive recording layer by a wire bar, dried at a temperature between 70° and 90° C., and then irradiated by ultraviolet light. Thus, a protective layer was provided on the reversible thermosensitive recording layer.

Formation of Magnetic Recording Layer

Using the same commercially available magnetic-film-provided thermal transfer ribbon made by Dainippon Ink & Chemicals, Incorporated, as employed in Example 1, a magnetic recording layer was thermally transferred in stripes to the above prepared protective layer by the same method as employed in Example 1. Thus, a comparative reversible thermosensitive recording medium No. 1 was obtained.

Figure 9A:
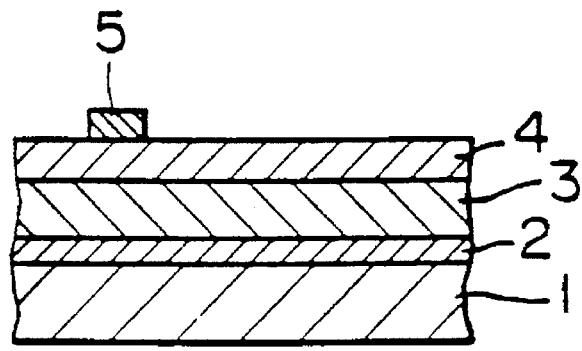
FIG. 9 shows schematic cross-sectional views of conventional reversible thermosensitive recording media comprising a magnetic recording layer.
Figure 9B:
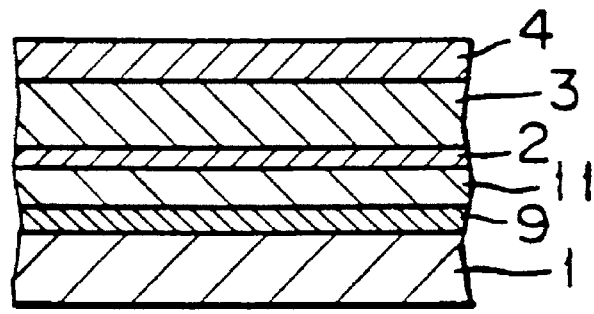
Figure 9C:
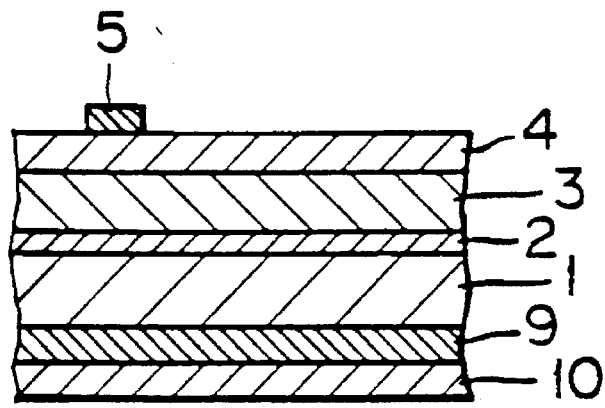

The comparative recording medium No. 1 thus obtained was cut to a predetermined size, whereby a comparative reversible thermosensitive recording card No. 1 with the same structure as that shown in FIG. 9(Q) was prepared.

COMPARATIVE EXAMPLE 2

According to the same method as employed in Comparative Example 1, a light reflection layer, a reversible thermosensitive recording layer, a protective layer and a magnetic recording layer were successively overlaid on the same commercially available 188-µm-thick PET film "DS-1711" (Trademark), made by Dainippon Ink & Chemicals, Incorporated, as employed in Example 9, with a magnetic recording layer on the back surface thereof.

Further, a protective layer was entirely provided on the above-mentioned lower magnetic recording layer provided on the back surface of the PET film, by the same method as employed in Example 9, so that a comparative reversible thermosensitive recording medium No. 2 was obtained.

The comparative recording medium No.2 thus obtained was cut to a predetermined size, whereby a comparative reversible thermosensitive recording card No. 2 with the same structure as that shown in FIG. 9(S) was prepared.

COMPARATIVE EXAMPLE 3

Formation of Smoothening Layer

A solution of a commercially available ultraviolet-curing resin "C-164" (Trademark), made by Dainippon Ink & Chemicals, Incorporated, was coated by a wire bar on the surface of the commercially available 188-µm-thick PET film "DS-1711" (Trademark), made by Dainippon Ink & Chemicals, Incorporated, which was opposite to the magnetic recording layer side. The coating liquid was dried, and then irradiated by ultraviolet light, so that a smoothening layer with a thickness of about 2 µm was provided on the support.

Formation of Light Reflection Layer

Aluminum was deposited on the above prepared smoothening layer, so that a light reflection layer with a thickness of 600 Å was provided on the smoothening layer.

Formation of Reversible Thermosensitive Recording Layer

The following components were mixed to prepare a coating liquid for a reversible thermosensitive recording layer:

|  | Parts by weight |
| --- | --- |
| Behenic acid | 7 |
| Eicosanedioic acid | 3 |
| Vinyl chloride-vinyl acetate copolymer (Trademark: "1000MT", | 25 |

-continued

|  | Parts by weight |
|---|---|
| made by Denki Kagaku Kogyo K.K.) | |
| Diallyl phthalate | 3 |
| Tetrahydrofuran | 150 |

The thus obtained coating liquid was coated on the above prepared light reflection layer by a wire bar and dried at 90° to 120° C., whereby a reversible thermosensitive recording layer with a thickness of about 5 μm on a dry basis was provided on the light reflection layer.

Formation of Upper Protection Layer

A 50% solution of a commercially available ultraviolet-curing resin "C7-157" (Trademark), made by Dainippon Ink & Chemicals, Incorporated, was coated on the above prepared reversible thermosensitive recording layer by a wire bar, dried at a temperature between 70° and 90° C., and then irradiated by ultraviolet light. Thus, an upper protective layer with a thickness of 3 μm on a dry basis was provided on the reversible thermosensitive recording layer.

Formation of Magnetic Recording Layer

Using the same commercially available magnetic-film-provided thermal transfer ribbon made by Dainippon Ink & Chemicals, Incorporated, as employed in Example 1, a magnetic recording layer was thermally transferred in stripes to the above prepared protective layer by the same method as employed in Example 1.

Formation of Lower Protective Layer

Further, a protective layer was entirely provided on the lower magnetic recording layer provided on the back surface of the PET film, by the same method as employed in Example 9, so that a comparative reversible thermosensitive recording medium No. 3 was obtained.

The comparative recording medium No. 3 thus obtained was cut to a predetermined size, whereby a comparative reversible thermosensitive recording card No. 3 with the same structure as that shown in FIG. 9(R) was prepared.

COMPARATIVE EXAMPLE 4

The procedure for preparation of the reversible thermosensitive recording medium No. 1 in Example 1 was repeated except that a magnetic recording layer was provided in a part of the reversible thermosensitive recording layer by use of a roll heater as shown in FIG. 11 instead of the roll heater as shown in FIG. 10, so that a comparative reversible thermosensitive recording medium No. 4 was obtained. In this case, when the magnetic recording layer was provided in a part of the reversible thermosensitive recording layer, heat was entirely applied. Therefore, some portions of the reversible thermosensitive recording layer which were not covered with the magnetic recording layer were caused to deteriorate, which induced the problem of repetition durability.

The comparative recording medium No. 4 thus obtained was cut to a predetermined size, whereby a comparative reversible thermosensitive recording card No. 4 was prepared.

EXAMPLE 17

The procedure for preparation of the reversible thermosensitive recording medium No. 1 in Example 1 was repeated except that there were provided concave portions on the surface of the reversible thermosensitive recording layer by thermal compression, and the magnetic recording layer was provided in stripes on the above-mentioned concave portions of the reversible thermosensitive recording layer, so that a reversible thermosensitive recording medium No. 17 according to the present invention was obtained.

The recording medium No. 17 thus obtained was cut to a predetermined size, whereby a reversible thermosensitive recording card No. 17 with the same structure as that shown in FIG. 2(B') was prepared.

EXAMPLE 18

The procedure for preparation of the reversible thermosensitive recording medium No. 3 in Example 3 was repeated except that there were provided concave portions on the surface of the anchor layer by thermal compression, and the magnetic recording layer was provided in stripes on the above-mentioned concave portions of the anchor layer, so that a reversible thermosensitive recording medium No. 18 according to the present invention was obtained.

The recording medium No. 18 thus obtained was cut to a predetermined size, whereby a reversible thermosensitive recording card No. 18 with the same structure as that shown in FIG. 3(E') was prepared.

Using each of the reversible thermosensitive recording cards Nos. 1 to 18 according to the present invention and the comparative reversible thermosensitive recording cards Nos. 1 to 4, the following evaluation tests were conducted.

(1) Evaluation of durability of reversible thermosensitive recording layer.

Using a card-recording apparatus with a thermal head of 8 dot/mm, images were formed on each reversible thermosensitive recording card by applying thereto a thermal energy of 0.3 mJ/dot, and the images thus obtained were erased by applying thereto a hot stamp of 100° C. for one second with the application of a pressure of 100 g/cm$^3$. Such an image forming and erasing operation was repeated 500 times to evaluate the durability of the reversible thermosensitive recording layer. The image densities of the obtained images were measured by Mcbeth reflection-type densitometer RD-918 at the initial stage and after the image forming and erasing operations were repeated 500 times. The results are shown in Table 2. The smaller the numeral shown in Table 2, the higher the image density.

(2) Evaluation of adhesion properties of magnetic recording layer.

In accordance with the method as prescribed in JIS K 5400-1900, the magnetic recording layer provided in stripes on each recording card was cut into numerous squares of 1 mm$^2$ by use of a cutter knife in such a manner that the cutter knife was placed at an angle of 35° to 45° from the surface of the magnetic recording layer and caused to move at a uniform velocity over a period of about 0.5 sec to made one cut so that the cut might penetrate through the magnetic recording layer and reach the surface of the under layer. In this case, the edge of the cutter was constantly made keen. Thereafter, an adhesive cellophane tape was stuck on the magnetic recording layer and peeled therefrom at an angle of 45° to evaluate the peeling of the magnetic recording layer.

In proportion to the degree of peeling as prescribed in Table 1, marks were given to each recording card:

TABLE 1

| Marks | Degree of Peeling of Magnetic Recording Layer |
|---|---|
| 10 | No peeling occurred at the intersecting points of cuts, and each square was not peeled |
| 8 | There was a slight peeling at the intersecting points of cuts, but each square was not peeled. The area of a portion where the peeling was observed was 5% or less of the total area of all squares. |
| 6 | Peeling occurred at the intersecting points of cuts and both edges of each cut. The area of a portion where the peeling was observed was in a range of 5 to 15% of the total area of all squares. |
| 4 | The peeling was considerable. The area of a portion where the peeling was observed was in a range of 15 to 35% of the total area of all squares. |
| 2 | The peeled portion of each square was further increased. The area of a portion where the peeling was observed was in a range of 35 to 65% of the total area of all squares. |
| 0 | The area of a portion where the peeling was observed was more than 65% of the total area of all squares. |

The adhesion properties of the magnetic recording layer including the upper and lower magnetic recording layers were expressed by the above-mentioned marks as shown in Table 2.

(3) Evaluation of shaved and peeled condition of magnetic recording layer.

Each recording card was caused to manually pass through the commercially available key-lock test apparatus with a magnetic reader, made by Miwa Lock Co., Ltd. 10,000 times. Then the shaved condition of the magnetic recording layer of each recording card was visually observed, and the evaluation was carried out in accordance with the following scale:

⊚: The surface of the magnetic recording layer was not shaved at all.

○: The surface of the magnetic recording layer was partially shaved.

x: The entire surface of the magnetic recording layer was shaved.

In addition, it was also visually observed whether the magnetic recording layer was peeled or not, and the evaluation was carried out in accordance with the following scale:

⊚: The magnetic recording layer was not peeled at all.

○: The magnetic recording layer was partially peeled.

x: The magnetic recording layer was considerably peeled.

The results are shown in Table 2.

(4) Occurrence times of reading error from the magnetic recording layer.

Each recording card was caused to pass through a commercially available card reader and writer, "Ku-A461" (Trademark), made by Kyusyu Matsushita Electric Works Ltd., 500 times. The number of times when the reading error occurred from the magnetic recording layer was counted. The results are shown in Table 2.

TABLE 2

| | Structure of Layers (*) | Image Density At initial stage | Image Density After repetition of 500 times | Adhesion Properties of M.R. Layer () Upper M.R. layer | Adhesion Properties of M.R. Layer () Lower M.R. layer | Shaved Condition of M.R. Layer after 10,000 Operations () | Peeled Condition of M.R. Layer after 10,000 Operations () | Reading Error Occurrence Times |
|---|---|---|---|---|---|---|---|---|
| Ex. 1 | B | 0.22 | 0.27 | 8 | — | ⊚ | ○ | 0 |
| Ex. 2 | C | 0.22 | 0.28 | 8 | — | ○ | — | 0 |
| Ex. 3 | E | 0.21 | 0.27 | 10 | — | ⊚ | ○ | 0 |
| Ex. 4 | F | 0.22 | 0.26 | 10 | — | ○ | — | 0 |
| Ex. 5 | G | 0.28 | 0.28 | 8 | 9 | ⊚ | — | 0 |
| Ex. 6 | H | 0.22 | 0.30 | 8 | 9 | ○ | — | 0 |
| Ex. 7 | I | 0.20 | 0.27 | 10 | 9 | ⊚ | — | 0 |
| Ex. 8 | J | 0.21 | 0.25 | 10 | 9 | ○ | — | 0 |
| Ex. 9 | K | 0.21 | 0.26 | 8 | — | ⊚ | — | 0 |
| Ex. 10 | L | 0.21 | 0.29 | 10 | — | ⊚ | — | 0 |
| Ex. 11 | M | 0.70 | 0.82 | 8 | — | ⊚ | — | 0 |
| Ex. 12 | N | 0.70 | 0.84 | 8 | — | ○ | — | 0 |
| Ex. 13 | O | 0.55 | 0.60 | 8 | — | ⊚ | — | 0 |
| Ex. 14 | P | 0.54 | 0.58 | 8 | — | ○ | — | 0 |
| Ex. 15 | A | 0.22 | 0.88 | 7 | — | ○ | — | 0 |
| Ex. 16 | D | 0.22 | 0.40 (***) | 10 | — | ○ | — | 0 |
| Ex. 17 | B' | 0.22 | 0.26 | 10 | — | ⊚ | ○ | 0 |
| Ex. 18 | E' | 0.22 | 0.27 | 10 | — | ⊚ | ○ | 0 |
| Comp. Ex. 1 | Q | 0.22 | 0.29 | 5 | — | X | X | 120 |
| Comp. Ex. 2 | S | 0.21 | 0.27 | 4 | — | X | — | 150 |

TABLE 2-continued

| | | Image Density | | Adhesion Properties of M.R. Layer (**) | | Shaved Condition of M.R. Layer after | Peeled Condition of M.R. Layer after | |
|---|---|---|---|---|---|---|---|---|
| | Structure of Layers (*) | At initial stage | After repetition of 500 times | Upper M.R. layer | Lower M.R. layer | 10,000 Operations () | 10,000 Operations () | Reading Error Occurrence Times |
| Comp. Ex. 3 | R | 0.55 | 0.72 | — | — | ○ | — | 250 |
| Comp. Ex. 4 | B | 0.45 | 0.65 | 6 | — | ⊚ | X | 0 |

(*) See FIGS. 2 to 9.
(**) M.R. Layer denotes "magnetic recording layer".
(***) The fused head dust was easily attached to the thermal head, and the obtained images therefore appeared broken. Thus, the image density was decreased.

As can be seen from the results in Table 2, the magnetic reading errors frequently occurred when the comparative recording cards were employed, while most of the recording cards of the present invention did not cause such a reading error. In addition, the adhesion properties of the magnetic recording layer to the under layer were considerably poor in the comparative recording card, so that the magnetic recording layer was easily shaved and peeled.

Further, the recording card in which the protective layer was overlaid on the magnetic recording layer showed excellent durability of the magnetic recording layer, as compared with the recording card in which the protective layer was not provided on the magnetic recording layer.

As previously explained, the reversible thermosensitive recording medium of the present invention can attain the repeated formation of high quality images without the decrease of the image density even though thermal energy is applied to the recording medium many times using a thermal head. At the same time, the magnetic recording layer is not peeled or scratched during the repeated operations, and no magnetic reading error occurs in the repeated operations.

Japanese Patent Application No. 06-195909 filed Jul. 28, 1994 is hereby incorporated by reference.

What is claimed is:

1. A reversible thermosensitive recording medium comprising:
   (a) a support
   (b) a reversible thermosensitive recording layer formed on said support, comprising a matrix resin and an organic low-molecular-weight material dispersed in said matrix resin, capable of reversible assuming a transparent state and a white opaque state depending on the temperature thereof, and
   (c) a magnetic recording layer which is integrally provided in a part of said reversible thermosensitive recording layer.

2. The reversible thermosensitive recording medium as claimed in claim 1, further comprising a protective layer which is provided so as to cover a portion of said reversible thermosensitive recording layer which is not covered with said magnetic recording layer.

3. The reversible thermosensitive recording medium as claimed in claim 1, further comprising a protective layer which is provided so as to cover said magnetic recording layer and a portion of said reversible thermosensitive recording layer which is not covered with said magnetic recording layer.

4. The reversible thermosensitive recording medium as claimed in claim 2, wherein said protective layer comprises a curing resin selected from the group consisting of an ultraviolet-curing resin and an electron radiation curing resin.

5. The reversible thermosensitive recording medium as claimed in claim 1, further comprising a light reflection layer which is provided between said support and said reversible thermosensitive recording layer.

6. The reversible thermosensitive recording medium as claimed in claim 1, further comprising a colored layer which is provided between said support and said reversible thermosensitive recording layer.

7. The reversible thermosensitive recording medium as claimed in claim 1, further comprising a magnetic recording layer which is at least partially provided on the back surface of said support, opposite to said reversible thermosensitive recording layer with respect to said support.

8. The reversible thermosensitive recording medium as claimed in claim 7, further comprising a protective layer which is provided so as to cover a portion of said back surface of said support which is not covered with said magnetic recording layer.

9. The reversible thermosensitive recording medium as claimed in claim 7, further comprising a protective layer which is provided so as to cover said magnetic recording layer, and if any, a portion of said back surface of said support which is not covered with said magnetic recording layer.

10. The reversible thermosensitive recording medium as claimed in claim 8, wherein said protective layer comprises a curing resin selected from the group consisting of an ultraviolet-curing resin and an electron radiation curing resin.

11. A reversible thermosensitive recording medium comprising:
   (a) a support,
   (b) a reversible thermosensitive recording layer formed on said support, comprising a matrix resin and an organic low-molecular-weight material dispersed in said matrix resin, capable of reversibly assuming a transparent state and a white opaque state depending on the temperature thereof,
   (c) an anchor layer provided on said reversible thermosensitive recording layer, and
   (d) a magnetic recording layer which is integrally provided in a part of said anchor layer.

12. The reversible thermosensitive recording medium as claimed in claim 11, further comprising a protective layer which is provided so as to cover a portion of said anchor layer which is not covered with said magnetic recording layer.

13. The reversible thermosensitive recording medium as claimed in claim 11, further comprising a protective layer which is provided so as to cover said magnetic recording layer, and a portion of said anchor layer which is not covered with said magnetic recording layer.

14. The reversible thermosensitive recording medium as claimed in claim 12, wherein said protective layer comprises a curing resin selected form the group consisting of an ultraviolet-curing resin and an electron radiation curing resin.

15. The reversible thermosensitive recording medium as claimed in claim 11, further comprising a light reflection layer which is provided between said support and said reversible thermosensitive recording layer.

16. The reversible thermosensitive recording medium as claimed in claim 11, further comprising a colored layer which is provided between said support and said reversible thermosensitive recording layer.

17. The reversible thermosensitive recording medium as claimed in claim 11, further comprising a magnetic recording layer which is at least partially provided on the back surface of said support, opposite to said reversible thermosensitive recording layer with respect to said support.

18. The reversible thermosensitive recording medium as claimed in claim 17, further comprising a protective layer which is provided so as to cover a portion of said back surface of said support which is not covered with said magnetic recording layer.

19. The reversible thermosensitive recording medium as claimed in claim 17, further comprising a protective layer which is provided so as to cover said magnetic recording layer, and if any, a portion of said back surface of said support which is not covered with said magnetic recording layer.

20. The reversible thermosensitive recording medium as claimed in claim 18, wherein said protective layer comprises a curing resin selected from the group consisting of an ultraviolet-curing resin and an electron radiation curing resin.

21. The reversible thermosensitive recording medium as claimed in claim 11, wherein said anchor layer comprises at least one polymer selected from the group consisting of polyvinyl chloride, polyester, polyethylene, polypropylene, polystyrene, polyacrylate, polyacrylamide, polyamide, polyvinyl pyrrolidone, a natural rubber, polysiloxane, polyvinyl alcohol, polyacrolein, and a copolymer comprising at least one monomer constituting said polymers.

* * * * *

UNITED STATES PATENT AND TRADEMARK OFFICE
CERTIFICATE OF CORRECTION

PATENT NO. : 5,625,524
DATED : APRIL 29, 1997
INVENTOR(S) : YUKIO KONAGAYA ET AL

It is certified that error appears in the above-identified patent and that said Letters Patent is hereby corrected as shown below:

Column 16, line 41, "ration" should read --ratio--;
    line 44, "as" (2nd. occurrence) should read --was--.

Column 18, line 38, "No. 5thus" should read --No. 5 thus--.

Column 21, line 40, "sown" should read --shown--.

Column 26, Table 2, fourth column, "0.88" should read --0.88(***)--;
    Ex. 17, eighth column, " ◯ " should read -- ⊙ --;

Ex. 18, eighth column, " ◯ " should read -- ⊙ --.

Signed and Sealed this

Sixteenth Day of June, 1998

*Attest:*

BRUCE LEHMAN

*Attesting Officer*     *Commissioner of Patents and Trademarks*